United States Patent [19]

Pedersen

[11] Patent Number: 4,811,030
[45] Date of Patent: Mar. 7, 1989

[54] MARKER FOR SUBTERRANEAN MARKING AND A NOVEL APPLICATION FOR SUCH A MARKER

[76] Inventor: Willy P. Pedersen, Filippavej 37, Höjbjerg, Denmark

[21] Appl. No.: 751,203

[22] Filed: Jul. 2, 1985

Related U.S. Application Data

[63] Continuation of Ser. No. 511,166, Jun. 8, 1983, abandoned.

[51] Int. Cl.$^4$ .............................................. H01Q 7/08
[52] U.S. Cl. ..................................... 343/788; 343/719
[58] Field of Search ....................... 343/719, 787, 788

[56] References Cited

U.S. PATENT DOCUMENTS 3,965,474  6/1976  Guerrino et al. ................... 343/719
4,334,227  6/1982  Marks ................................. 343/719

Primary Examiner—William L. Sikes
Assistant Examiner—Robert E. Wise
Attorney, Agent, or Firm—Antonelli, Terry & Wands

[57] ABSTRACT

A geodetic fixpoint system comprising plural terrestrial fixpoints marked by subterranean fixpoint markers with resonance circuits. The markers reveal themselves by a virtual vertical axis searchable by a surface search detector and the fixpoints are found by intersection between the virtual vertical axis and the ground surface. The markers are mounted with spacing sufficient to allow any fixpoint, when marked visually, to be visible from at least one other fixpoint of the system. The surface search detector generates a frequency which is a nominal resonance frequency of the resonance circuits of the markers, and receives the generated frequency from the markers to search for the virtual vertical axis.

9 Claims, 1 Drawing Sheet

MARKER FOR SUBTERRANEAN MARKING AND A NOVEL APPLICATION FOR SUCH A MARKER

This is a continuation of application Ser. No. 511,166, filed June 8, 1983, now abandoned.

This invention relates to a marker for subterranean marking, comprising a housing having an internal resonance circuit based on an electric coil.

It is known that subterranean objects or local areas in the ground, e.g. the area of a cable joint, may be marked in an invisible and non-disturbing manner by laying or digging down a marker in the form of a so-called earth coil unit, i.e. a flat box containing a coil of a diameter of the magnitude 50 cm and connected with a condenser to form a resonance circuit of a given resonance frequency, e.g. 80 kHz. Such an earth coil, which may be placed at a depth of about 1 m, may be detected by means of a special search equipment consisting of a portable radar like apparatus, which transmits downwardly directed pulses of the particular frequency and is switched to a receiver mode during the time gaps between the pulses, whereby it reacts to corresponding signals as occuring by energy reflection from the earth coil, when the antenna of the apparatus is located overhead the coil.

The said earth coils are reasonably easy to mount in places, where the earth has already been digged up, but otherwise they are expensive to mount, because they require a real digging work. So far the earth coils have been used to a small extent only, for a coarse marking of special installations such as joining wells and telephone cables.

It is even known to make use of earth coils with mutually different resonance frequencies, e.g. 80 kHz and 100 kHz, whereby a selective marking may be established for different types of installations. A search for a 80 kHz coil may be effected by a search device working at 80 kHz, without the search being disturbed by such 100 kHz coils, which happen to be present in the search area.

It is the purpose of the invention to provide a marker of the earth coil type, which is both simple in construction and easy to mount in the ground, even so as to condition a localization of increased accuracy, whereby the practical application possibilities of the marker will be extremely extended.

The invention departs from the observation that it is possible, in practice, to design the said earth coils with a diameter reduced to such an extent that they may assume a vertically oriented rod shape rather than a horizontal plate shape, whereby they will be mountable in the ground in a highly simplified manner, e.g. by being lowered into a drilled hole without requiring any real digging work. This observation is based on experiments having verified that the earth coils at least maintain their efficiency when they are wound onto small diameter ferrite cores, whereby a coil casing may occur as a cylindrical unit having a diameter of the magnitude 5 cm and a length of e.g. 15–20 cm. Such coil units will be mountable with exact orientation in narrow holes in the ground, and because narrow holes are extremely easy to provide as compared to excavations for broad coil units, the ferrite core coil units will be practically usable to an extent widely surpassing the usability of the known flat earth coils.

Thus, the invention will condition a widespread use of the earth coils for marking purposes generally, i.e. both for marking of particular objects or lines and—according to the invention—for marking of coordinate points without specific relevance to material objects, e.g. characteristic boundary points of or in the land register system, such use being actualized by virtue of the increased case and accuracy with which the markers according to the invention are mountable and detectable.

Insafar as the invention will thus invite to a drastic increase of the use of underground markers, even for official purposes, it will be extra important that the markers show a high degree of mechanical and electrical stability, and that the markers as a standard product will be mountable under different exterior dielectric conditions without these differences affecting the resonance frequency of the markers to any significant degree. Some markers are to be mounted in dry earth and others in ground water as giving quite different dielectrical conditions, which could well cause considerable changes of the resonance frequency. Furthermore, it should be aforeseen that the markers should remain earth mounted and operative during unusual long time, e.g. 50–100 years or more, and the markers, therefore, should be sealed against intrusion of water, which could change the dielectric conditions inside the marker.

Based on these considerations the marker according to the invention is characterized by the features stated in the characterizing clause of claim 1. This marker will show increased usefulness and stability compared with the known flat earth coils, partly because it may be produced cheaper and be mounted much cheaper than these, and partly because its resonance frequency will be practically unaffected by even extreme variations of the dielectric properties of the mounting surroundings. Moreover, the stick shaped marker is mountable exactly vertically in the ground much easier than a flat coil unit is mountable exactly horizontally therein, i.e. the marker according to the invention may easily be mounted so as to produce a really exact marking of a point or a arrow area of the earth surface, which has not even been aimed at by the use of the known flat coils.

The marker according to the invention shows the further advantage that it will be fully efficient even if mounted just above a ferromagnetical object in the ground, e.g. an iron well lid or some casual iron object.

The increased usability of the markers according to the invention may be further supported by the fact that each point may be marked in a selective manner by means of two or more different coils or resonance circuits, e.g. one responding to a general standard search frequency and one or more responding to special identification frequencies for particular types of marking points. In connection with the invention such different coils or resonance circuits may be mounted or built together immediately next to each other in the direction of the ferrite core.

The markers according to the invention will be superior not only to the said flat earth coils, but also to the use of e.g. permanent magnetic rods for marking purposes, as already suggested in the art, though such rods are of course easy to mount in the ground; magnetic rods may be turned non-magnetic by influence from outside, and casual iron objects may be or become magnetic, e.g. by lightning currents, whereby the marking will be very unreliable.

Because the present markers are advantageous with respect to both production and mounting costs, accuracy, selectivity and reliability, they will be usable at much larger scale than so far anticipated. It will be possible to mark an increased number of objects, even with the use of an increased number of markers along elongated objects such as pipes or cables. An extremely important aspect of the invention, however, is not at all related to a direct marking of objects, but to the marking of fixpoints in land register systems. The marking of boundary points, e.g. between private ground pieces, has already been mentioned as an example, but a much larger step in the use of the invention is to provide for geodetic fixpoint markings, which will later on serve to highly facilitate any land surveyor work in the particular area, whether in large or narrow scale. It has already been demonstrated and generally accepted that the markers according to the invention are usable for such an official purpose.

It will be appreciated that the novel concept of the invention with respect to the establishing of official geodetic fixpoints is extremely important and advantageous in that the marking as such will not manifest itself materially and thus not be an obstracle to or be spoiled by ordinary surface earth treatments. When the positions of the fixpoints are coarsely known from relevant maps, the exact positions in the field will be findable by means of the relevant search equipment, and once a marker position is found, the spot may be temporarily visually marked by a ranging pole or the like, whereafter the surveyor work may be carried out in the usual manner.

In the following the marker according to the invention is described in more detail with reference to the drawing, in which.

Figure 1:
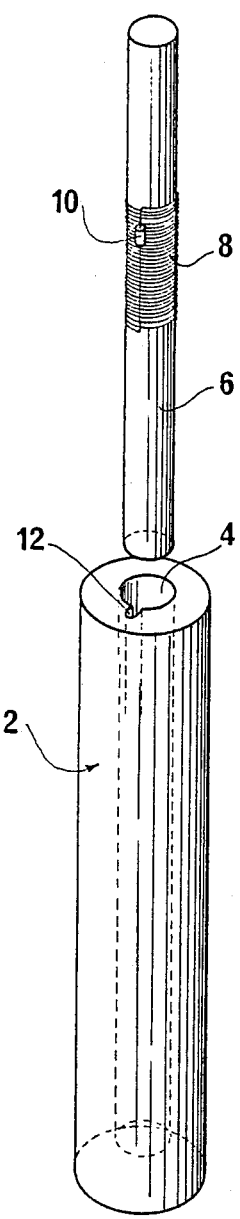
FIG. 1 is a perspective exploded view of a marker.
Figure 3:
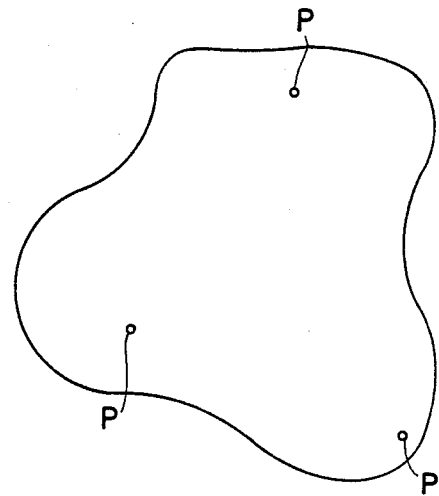
FIG. 3 is a plan view of an area where, for instance, markers of the type shown in FIG. 2 mark fixpoints in a land register systrem or mark boundary points.

The marker as shown in FIG. 1 comprises an outer rod shaped casing 2, which is a thick walled tube of PVC or a similar material of good mechanical and dielectrical properties and of very low water absorption. The casing or tube 2 is closed bottomwise, integrally if the casing is die cast, preferably then from polyethylene, or by means of any suitable, sealing stopper material if the casing 2 is a tube member cut from a tubular extrusion of a PVC material. In both cases the casing 2 has a central channel 4, which is open at one end and is adapted to receive a ferrite rod 6, on which is wound an electric coil 8, the opposed ends of which are interconnected through a condenser 10 for forming a resonance circuit, preferably having a resonance frequency of 50–200 kHz. The coil 8 is a one layer coil, whereby generally the channel or hole 4 may show a diameter which is only some 1 mm larger than the diameter of the core rod 6. The condenser 10, of course, adds to the thickness of the rod 6, but in order to minimize the free space outside the rod 6 upon insertion thereof in the channel 4, the wall of the channel is provided with a recess 12 for receiving the condenser 10.

In the production care is taken that the remaining free space inside the channel 4 upon insertion of the rod 6 is entirely eliminated by introduction of a suitable water resistant casting material, e.g. an artificial resin. Also the top end of the channel 4 is filled out by such a material above the top end of the inserted rod 6, or the channel end or ends are in any other suitable manner closed absolutely sealingly, such that water intrusion to the immediate surroundings of the coil is positively excluded.

Thus, the coil will be present in almost everlasting immediate surroundings which will show constant and good dielectric properties. Due to the pronounced thickness of the tube 2 the coil will experience these good properties practically irrespectively of the dielectric properties of the outer surroundings of the tube 2, and thus the resonance frequency of the circuit 8,10 will remain practically constant under all mounting conditions of the marker, which is of utmost importance in practice.

Figure 2:
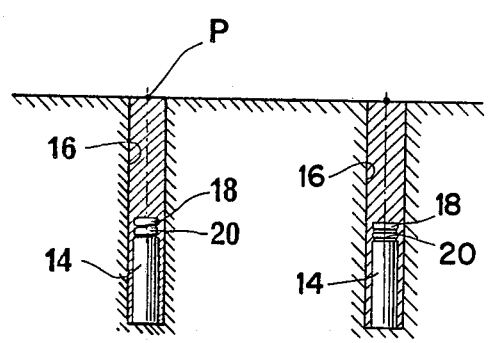
FIG. 2 is a sectional view illustrating the mounting of markers in the ground.
Figure 4:
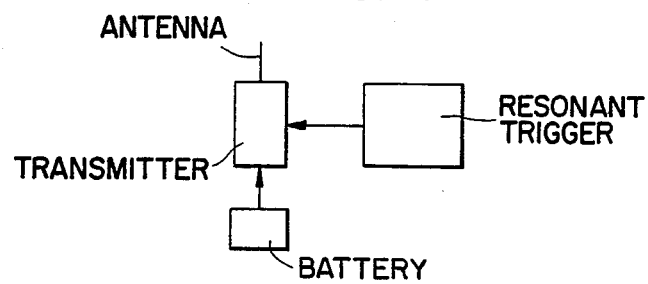
FIG. 4 is a block diagram of a conventional system with a battery driven transmitter with antenna to transmit, e.g., a characteristic frequency signal for obtaining a response from the markers of FIG. 2.

FIG. 2 shows a marker 14 mounted in a narrow and afterfilled ground hole 16. As an optional possibility it is also shown that on the top of the marker there is placed two further, short marker units 18 and 20, which represent additional sealed casings each containing a resonance circuit of some particular or selected resonance frequency for selective identification. These casings, without having any long coil core, are fully operative when placed in the axis of the ferrite core of the marker 14. Alternatively, if a specific combination of resonance frequencies is desired for a whole series of markers these markers may be produced with the different circuits located on the same core 6.

It is a specific advantage of the invention that different resonance circuits even when placed closely together do not to any disturbing degree affect the resonance frequency of each other, and in practice, therefore, the different resonance frequencies need not deviate very much from each other in order to be safely selectively detectable. The difference so far need not be more than some 5–10 kHz, which is less than the half compared with coil units of the said known type.

In a practical example the outer diameter of the casing tube 2 is 40 mm and its length 21 cm. The diameter of the ferrite rod 6 is 10 mm and its length 200 mm. The coil 8 has 90 turns in one layer, length 60 mm, and the condenser 10 has a capacity of 3,3 nF, all corresponding to a resonance frequency of 82 kHz. The ferrite rod 6 is of the long wave type as use for built-in radio areals. Normally the lower limit of the frequency range of this material is considered to be 200 kHz, but is has been found usable for the present purpose even below 100 kHz, where search frequencies are permissible as not interfering with other signal communication.

The known markers generally have served the purpose to be found, literally, by showing the way to themselves once they have been roughly detected from above. The marker according to the invention, of course, may serve the same purpose in connection with the marking of objects to be found in the ground, but according to the said special aspect of the invention, whereby the marker is used for geodetic and similar marking, it is important that the purpose of the marker is nothing but to mark the location of the surface point P above the marker as illustrated in FIG. 2. For official use it will be a requirement that the point P can be localized with high accuracy, even if the surface level has been moderately changed after the mounting of the marker, and experiments have proved that the marker according to the invention is well suited to condition the said high accuracy when it has been accurately mounted and is searched by means of a reasonably accurate search apparatus.

There will be numerous possibilities of sophisticating the mode of operation or mode of responding of the markers. For example, the markers may contain active elements for producing specific indentification signals in response to the coil being actuated by the required characteristic frequency or otherwise by characteristic signals as produced and transmitted from above, e.g. specific pulse trains. The said active elements may be voltage supplied from a battery or from a supply circuit actuated by wireless energy radiation from above. Batteries may be charged the same way.

When the search signal is based on pulses it will be possible to produce different response signals from a passive coil circuit, e.g. by means of a frequency converter which is actuated by the initial resonance, or by actuation of a circuit for modulating the resonance signal. The circuit of the marker may even be adapted so as to be actuatable for response solely by coded actuator signals from the search apparatus. Moreover, the responding circuitry of the marker may be programmable to produce individual information, e.g. as to distance and direction to another marked point, and such programming may even be effected or reeffected from above by way of suitable wireless actuation. It will be appreciated that all these and further corresponding possibilities will need no detailed description of this place, because they will be open to the experts in the relevant field of the technology.

When the markers are used for geodetic marking they are in no way bound to be placed at neutral or protected locations, and it will thus always be possible to mount a marker at such a location, from which another marked point is visible, when temporarily marked visually, and a very important result of this is that measurements in the field can be based on the exact line of connection between the two known points without any problems with respect to the finding of the true north direction or other non-marked parameters. The marked points should not necessarily be located in any strict coordinate pattern, when only their absolute coordinates in a superior coordinate system are known.

It will be appreciated that the geodetic aspect of the invention is extremely important, because it provides for new possiblities of building up a marking system, which is much more detailed and much easier to use than the conventional systems. The main conditions for this remarkable result are that the markers are cheap in production as a standard product non-sensitive to installation in different types of immediate surroundings, easy to mount in exact positions, non-changeable throughout many years, and responsive to search signals in a highly reliable, exact and selective manner. The described marker according to the invention fulfills all these conditions, but it will be appreciated that the invention will necesarily comprise, for land marking purposes, the use of any type of marker correspondingly fulfilling all these conditions, whether or not the response of the marker is basically conditioned by the effect of a resonance circuit; thus, the invention will comprise, for this particular use, any marker operable to produce from a subterranean position a well defined and well localizable output field adjacent the earth surface so as to enable a surface localization of the marker with high accuracy by means of a suitable search equipment.

In the foregoing specific attention has been paid to the markers as including a resonance circuit. It will be appreciated that the basic requirement is a transfer of wireless energy between a surface apparatus and the marker and that to this end the use of a resonance circuit is important for avoiding waste of energy. However, the invention will not principally be limited to the ideal solution in this respect, i.e. other energy transfer systems may be involved, whether based on magnetic induction or electromagnetic waves. The markers, also named probes or "sondes", will typically be mounted at a depth of about one meter or generally between 60 cm and two meters, and especially by deep mounting it may be critical that energy waste be kept on a minimum.

It should be mentioned that the markers according to the invention will be searchable not only by the already described radar devices, but also by another type of known search devices which have separate transmitter and receiver antennas for continuous operation during the search.

I claim:

1. A geodetic fixpoint system comprising a plurality of terrestrial fixpoints marked and defined by respective subterranean fixpoint markers in the ground, wherein the markers include resonance circuits and operate underneath a surface working depth of the ground to reveal themselves by a virtual vertical axis searchable by a surface search detector means, the respective fixpoints being accurately defined by intersection between the virtual vertical axis and the ground surface, the markers generally being mounted with mutual spacing therebetween sufficient to allow any fixpoint, when marked visually, to be visible from at least one other fixpoint of the system, and the surface search detector means being provided for generating a frequency which is a nominal resonance frequency of the resonance circuits of the respective markers and for receiving said generated frequency from the markers to search for the virtual vertical axis.

2. A primary marker for subterranean marking in a geodetic fixpoint system, comprising a resonance circuit having a primary resonance frequency including an electric coil and capacitor mounted around a cylindrical ferrite core rod encapsulated in a rigid, non-magnetic and water-proof material, and provided in a bore of a preshaped, dielectric housing member, said bore having a diametger only slightly larger than the outer diameter of the coil and having in its wall an axial recess for receiving the capacitor connected with the coil adjacent the cylindrical outside surface of the ferritre core, said housing member being generally cylindrical and having an outer diameter of at least twice the diameter of the coil, and said bore configured to be entirely sealingly closed at both ends.

3. A marker according to claim 2, wherein a separate marker capsule containing a resonance circuit of a different resonance frequency from the primary resonance frequency is mounterd topwise on the primary marker.

4. A marker according to claim 2, wherein the housing member is an extruded PVC tube.

5. A marker according to claim 2, wherein the bore is provided with a dielectric filler material to fill a space defined between the bore well and the ferrite core.

6. A marker according to claim 2, wherein at least two different resonance circuits are provided in the marker and produce selective output signals detectable above the ground.

7. A marker according to claim 2, wherein the housing member is a PEH tube die cast so as to be closed at one end.

8. A marker according to claim 2, wherein at least two different active elements are provided in the marker and produce selective output signals detectable above the ground.

9. A marker according to claim 2, wherein at least two different resonance circuits and active elements are provided in the marker and produce selective output signals detectable above the ground.

* * * * *